United States Patent
Stankowski et al.

(10) Patent No.: US 9,926,785 B2
(45) Date of Patent: Mar. 27, 2018

(54) METHOD FOR RECONDITIONING A HOT GAS PATH PART OF A GAS TURBINE

(71) Applicant: ANSALDO ENERGIA IP UK LIMITED, London (GB)

(72) Inventors: Alexander Stankowski, Würenlingen (CH); Julien Rene Andre Zimmermann, Neuenhof (CH); Simone Hoevel, Lengnau (CH); Piero-Daniele Grasso, Niederweningen (CH); Sven Olliges, Dübendorf (CH); Sophie Betty Claire Duval, Zürich (CH)

(73) Assignee: ANSALDO ENERGIA IP UK LIMITED, London (GB)

( * ) Notice: Subject to any disclaimer, the term of this patent is extended or adjusted under 35 U.S.C. 154(b) by 0 days.

(21) Appl. No.: 14/851,459

(22) Filed: Sep. 11, 2015

(65) Prior Publication Data

US 2016/0069185 A1    Mar. 10, 2016

Related U.S. Application Data

(63) Continuation of application No. PCT/EP2014/052592, filed on Feb. 11, 2014.

(30) Foreign Application Priority Data

Mar. 19, 2013    (EP) .................... 13160050

(51) Int. Cl.
*F01D 5/00* (2006.01)
*B23P 6/00* (2006.01)
(Continued)

(52) U.S. Cl.
CPC .......... *F01D 5/005* (2013.01); *B23K 26/0006* (2013.01); *B23K 26/342* (2015.10);
(Continued)

(58) Field of Classification Search
CPC .......... F01D 5/005; B23P 6/002; B23P 6/005; B23P 6/007; Y10T 29/49318;
(Continued)

(56) References Cited

U.S. PATENT DOCUMENTS 3,770,487 A * 11/1973 Gibson ............. C04B 35/58071
                                                        220/62.11
4,305,697 A * 12/1981 Cohen .................... B23P 6/005
                                                        29/402.13
(Continued)

FOREIGN PATENT DOCUMENTS

CA    2717717 A1 *    4/2011    .............. B23P 6/005
EP    1231010 A1 *    8/2002    .............. B23P 6/005
(Continued)

*Primary Examiner* — Jason L Vaughan
(74) *Attorney, Agent, or Firm* — Buchanan Ingersoll & Rooney PC (57) ABSTRACT

A method for reconditioning a hot gas path part of a gas turbine to flexibly adapt an operation regime of said gas turbine for subsequent operation intervals. The method includes providing a hot gas path part to be reconditioned; removing a predetermined area of the hot gas path part, resulting in a cutout at the hot gas path part; and manufacturing a coupon for insertion into the cutout to replace the removed area of the hot gas path part. The method further includes inserting the coupon into the cutout; and joining the hot gas path part with the coupon. The coupon is manufactured by a selective laser melting method resulting in a fine grain sized material with significantly improved low cycle fatigue lifetime. The hot gas path part is coated, at least in an area including the inserted coupon, with a metallic overlay with improved thermo-mechanical fatigue and oxidation lifetime.

13 Claims, 4 Drawing Sheets

(51) Int. Cl.
*F01D 5/28* (2006.01)
*B23K 26/342* (2014.01)
*B23K 26/00* (2014.01)
*C23C 4/073* (2016.01)
*B33Y 10/00* (2015.01)
*B23K 103/02* (2006.01)
*B23K 103/18* (2006.01)

(52) U.S. Cl.
CPC .............. *B23P 6/005* (2013.01); *C23C 4/073* (2016.01); *F01D 5/288* (2013.01); *B23K 2203/02* (2013.01); *B23K 2203/18* (2013.01); *B23K 2203/26* (2015.10); *B33Y 10/00* (2014.12); *F05D 2230/10* (2013.01); *F05D 2230/30* (2013.01); *F05D 2230/312* (2013.01); *F05D 2230/313* (2013.01); *F05D 2230/80* (2013.01)

(58) Field of Classification Search
CPC ......... Y10T 29/49732; Y10T 29/49734; Y10T 29/49737; Y10T 29/49742
See application file for complete search history.

(56) References Cited

U.S. PATENT DOCUMENTS

| | | | | |
|---|---|---|---|---|
| 4,714,632 A * | 12/1987 | Cabrera | .................. | C23C 10/02 427/255.18 |
| 4,774,149 A * | 9/1988 | Fishman | ............... | C22C 19/058 420/443 |
| 5,269,057 A | 12/1993 | Mendham | | |
| 5,732,467 A * | 3/1998 | White | .................. | B23K 20/021 29/889.1 |
| 5,797,725 A | 8/1998 | Rhodes | | |
| 5,962,103 A * | 10/1999 | Luthra | .................. | C04B 35/573 428/107 |
| 5,965,266 A * | 10/1999 | Goujard | ............... | C04B 35/013 427/228 |
| 6,036,995 A * | 3/2000 | Kircher | .................. | C23C 10/60 427/142 |
| 6,521,356 B2 * | 2/2003 | Zhao | ....................... | C23C 10/26 420/426 |
| 7,008,522 B2 * | 3/2006 | Boucard | ............... | C23C 28/3215 204/487 |
| 7,452,182 B2 | 11/2008 | Vance et al. | | |
| 7,601,431 B2 * | 10/2009 | Pareek | ....................... | C23C 4/06 428/557 |
| 7,670,116 B1 | 3/2010 | Wilson, Jr. et al. | | |
| 7,700,154 B2 * | 4/2010 | Olson | ....................... | C23C 8/04 118/715 |
| 7,718,280 B2 * | 5/2010 | Wilson | ................. | C23C 24/10 428/698 |
| 7,810,237 B2 * | 10/2010 | Lange | ..................... | B23P 6/005 29/402.09 |
| 7,959,409 B2 * | 6/2011 | Guo | ........................ | B23P 6/005 29/889.2 |
| 8,245,399 B2 * | 8/2012 | Anantharaman | ........ | F01D 25/24 29/402.03 |
| 8,539,659 B2 * | 9/2013 | Szela | ........................ | B21K 3/04 29/402.09 |
| 8,846,147 B2 * | 9/2014 | Eberling-Fux | .......... | B29B 11/16 427/249.2 |
| 8,910,361 B2 * | 12/2014 | Rickenbacher | ......... | B23P 6/005 29/402.13 |
| 8,940,417 B2 * | 1/2015 | Courcot | .................. | C04B 35/18 416/241 B |
| 8,978,249 B2 * | 3/2015 | Hovel | ..................... | B23P 6/005 29/402.09 |
| 9,022,733 B2 * | 5/2015 | Coupe | .................. | C04B 35/524 29/419.1 |
| 9,150,721 B2 * | 10/2015 | Bateman | .............. | C08G 59/502 |
| 9,416,667 B2 * | 8/2016 | Cui | ........................ | F01D 5/188 |
| 9,506,355 B2 * | 11/2016 | Nunez | ..................... | F01D 5/282 |
| 9,670,782 B2 * | 6/2017 | Gohler | ................... | F01D 5/286 |
| 2001/0014403 A1 * | 8/2001 | Brown | .................. | B22F 3/1055 428/539.5 |
| 2003/0082048 A1 * | 5/2003 | Jackson | .................. | B23P 6/005 415/115 |
| 2004/0261914 A1 * | 12/2004 | Boucard | ............... | C23C 28/3215 148/518 |
| 2005/0235492 A1 * | 10/2005 | Arness | ................. | B23K 9/0026 29/889.1 |
| 2006/0277753 A1 * | 12/2006 | Ntsama-Etoundi | ..... | B23P 6/005 29/889.1 |
| 2007/0116874 A1 * | 5/2007 | Olson | ....................... | C23C 8/04 427/248.1 |
| 2011/0059332 A1 * | 3/2011 | Hardwicke | ........... | C22C 19/007 428/615 |
| 2011/0071013 A1 * | 3/2011 | Newton | ............... | C04B 35/5622 501/95.2 |
| 2011/0099810 A1 * | 5/2011 | Stankowski | ........... | B22F 7/062 29/888 |
| 2011/0264413 A1 | 10/2011 | Stankowski et al. | | |
| 2011/0318562 A1 * | 12/2011 | Dry | ......................... | B29C 73/22 428/221 |
| 2012/0048912 A1 * | 3/2012 | Hu | .......................... | F01D 5/005 228/119 |
| 2012/0251777 A1 * | 10/2012 | Duval | ..................... | B22F 1/02 428/144 |
| 2013/0247377 A1 * | 9/2013 | Hathiwala | ............... | B23P 6/005 29/889.1 |
| 2013/0294904 A1 * | 11/2013 | Hunt | ....................... | B23P 6/005 415/208.1 |
| 2015/0147164 A1 * | 5/2015 | Cui | ........................ | F01D 5/188 415/175 |
| 2015/0321296 A1 * | 11/2015 | Belanger | ................ | C22C 19/07 228/119 |

FOREIGN PATENT DOCUMENTS

| | | | | |
|---|---|---|---|---|
| EP | 1 880 787 A1 | | 1/2008 | |
| EP | 2 009 243 A2 | | 12/2008 | |
| EP | 2 189 626 A1 | | 5/2010 | |
| EP | 2 196 624 A1 | | 6/2010 | |
| EP | 2 317 075 A2 | | 5/2011 | |
| WO | WO 2004096487 A1 * | 11/2004 | ............. | B23P 6/005 |
| WO | 2010/028913 A1 | | 3/2010 | |
| WO | 2013/017433 A1 | | 2/2013 | |

* cited by examiner

METHOD FOR RECONDITIONING A HOT GAS PATH PART OF A GAS TURBINE

CROSS-REFERENCE TO RELATED APPLICATIONS

This application claims priority to PCT/EP2014/052592 filed Feb. 11, 2014, which claims priority to EP Application No. 13160050.4 filed Mar. 19, 2013, both of which are hereby incorporated in their entireties.

TECHNICAL FIELD

The present invention relates to the technology of gas turbines. It refers to a method for reconditioning a hot gas path part of a gas turbine in order to flexibly adapt an operation regime of the gas turbine for subsequent operation intervals.

BACKGROUND

Up to now, turbine part refurbishing providers can only repair parts of an industrial gas turbine (IGT) with the goal to restore their original integrity, optionally including certain limited and local design changes in order to improve the turbine performance, overcome premature part degradation or even failures during standard operation regimes (base load, low to medium cyclic load).

A lot of prior art publications describe modular/hybrid IGT part concepts including repair approaches.

Document U.S. Pat. No. 7,670,116 B1 discloses a vane for use in a gas turbine engine, which vane is made of an exotic, high temperature material that is difficult to machine or cast. The vane includes a shell made from either Molybdenum, Niobium, alloys of Molybdenum or Niobium (Columbium), Oxide Ceramic Matrix Composite (CMC), or SiC—SiC ceramic matrix composite, and is formed from a wire electric discharge process. The shell is positioned in grooves between the outer and inner shrouds, and includes a central passageway within the spar, and forms a cooling fluid passageway between the spar and the shell. Both the spar and the shell include cooling holes to carry cooling fluid from the central passageway to an outer surface of the vane for cooling. This cooling path eliminates a serpentine pathway, and therefore requires less pressure and less amounts of cooling fluid to cool the vane.

Document U.S. Pat. No. 5,797,725 discloses a gas turbine engine vane and method of its manufacture. The vane is non-destructively removable from a vane segment to allow individual components to be replaced. The vane and end walls are coupled together by a retainer that is formed in place between the vane and the end wall and that can be removed by conventional techniques. In one form the retainer fills a pair of corresponding grooves in the vane and end wall member so as to mechanically couple the components together and minimize fluid leakage there between. The retainer is non-metallurgically coupled to the vane and end wall member. A portion of the vane is allowed to move relative to the end wall in response to thermal conditions.

Document U.S. Pat. No. 5,269,057 teaches a method for replacing airfoil components including the steps of identifying a portion of the airfoil to be replaced, removing the portion by a nonconventional machining process, such as continuous wire electrical discharge machining, and forming a replacement member utilizing a similar cutting process. A cutting path utilized to remove the portion to be replaced and to form the replacement member includes interlocking projections and sockets and may include one or more tapers along the cutting path so that the portion may be removed only by lifting in one direction. In cases where an entire airfoil is replaced, a first projection may be tapered in one direction while a second projection is tapered in an opposite direction so that the airfoil may not be removed as long as its adjacent flow path walls are fixed relative to one another. Gas bending load dampers and zero gap standoffs may also be included for precision alignment of the replacement member and further securement of the replacement member in the airfoil.

Document EP 2 196 624 A1 discloses a blade with a blade vane, a blade tip, a blade root and a platform that is formed between the blade tip and the blade root. A tie rod, a lower blade part and an upper blade part are made of different materials based on the application, where material properties are adaptable to respective local loads. The dimensions of the tie rod, the upper blade part and the lower blade part are clearly lesser than the dimension of the blade. The tie rod, the upper blade part and the lower blade part are connected together partly by a form closure.

Document EP 2 009 243 A2 discloses a turbine vane, which has an airfoil shell and a spar within the shell. The vane has an outboard shroud at an outboard end of the shell and an inboard platform at an inboard end of the shell. The shell includes a region having a depth-wise coefficient of thermal expansion and a second coefficient of thermal expansion transverse thereto, the depth-wise coefficient of thermal expansion being greater than the second coefficient of thermal expansion.

Document WO 2010/028913 A1 relates to a turbine blade for a gas turbine, wherein the trailing edge region designed in the manner of a cut-back trailing edge has a modular design. For this purpose, the region of the trailing edge of the blade is provided with a slot extending from the platform to the blade tip, wherein an insert component, in which the webs typical of a cut-back trailing edge are configured, is disposed in said slot. The insert thus comprises channels which are disposed between the webs and end in openings, from which coolant that can flow on the inside of the blade can flow out of the blade. With the proposed measure, a casting core that is further reinforced in the trailing edge region can be used for producing the cast blade, whereby the mechanical integrity thereof is improved and it has a lower tendency to break during the handling thereof. In addition, when using such a turbine blade the quantity of cooling air exiting at the trailing edge can be set comparatively accurately by way of a non-cast, conventionally produced insert.

Document U.S. Pat. No. 7,452,182 relates to a modular turbine vane assembly. The vane assembly includes an airfoil portion, an outer shroud and an inner shroud. The airfoil portion can be made of at least two segments. Preferably, the components are connected together so as to permit assembly and disassembly of the vane. Thus, in the event of damage to the vane, repair involves the replacement of only the damaged subcomponents as opposed to the entire vane. The modular design facilitates the use of various materials in the vane, including materials that are dissimilar. Thus, suitable materials can be selected to optimize component life, cooling air usage, aerodynamic performance, and cost. Because the vane is an assemblage of smaller sub-components as opposed to one unitary structure, the individual components of the vane can be more easily manufactured and more intricate features can be included.

Document EP 2 189 626 refers to a rotor blade arrangement, especially for a gas turbine, which rotor blade arrangement can be fastened on a blade carrier and comprises in each case a blade aerofoil element and a platform element, wherein the platform elements of a blade row form a continuous inner shroud. With such a blade arrangement, a mechanical decoupling, which extends the service life, is achieved by blade aerofoil element and platform element being formed as separate elements and by being able to be fastened in each case separately on the blade carrier.

Document WO 2013/017433 A1 relates to a method for creating a blade for a flow force engine and to such a blade. According to the invention, components are produced by an additive production method such as selective laser melting, while a main body is produced by casting, for example. The blade components can consist of a different material or carry functions such as serving as drainage slots, for example. The advantage is that the expense related to the use of additive production methods occurs only for the components in which a complicated geometry, for example, must be implemented. The remaining components in the form of the main body, comprising the blade, the blade foot and the blade head, can be cost-effectively implemented as a cast part or a sheet metal part.

The well known, widely established, standard (best practice) reconditioning procedures of IGT hot gas path parts have the following disadvantages:

- Repaired parts get a standard reconditioning only, in order to fulfill the original new make (OH/cycle/EOH) target conditions for a second, third or an extended subsequent operation interval;
- no considerable design changes can be adopted without affecting or risking the parts, i.e. their mechanical integrity;
- no considerable design changes can be adopted without implying significant (time consuming and high cost) efforts;
- only local and limited design improvements do not allow significant changes in operation regime (a transition from base load operation to cyclic load/"peaker" operation is impossible);
- parts with consumed cyclic lifetime (from previous accomplished operation intervals) cannot be restored anymore to allow another subsequent cyclic or even high cyclic ("peaker") operation regime. It is expected that the future power market will rather ask for cyclic lifetime than for operation hours, generally leading to an earlier expiry of cycles than operation time;
- parts with (locally) material based limitations (oxidation/corrosion and/or mechanical/physical properties) cannot be improved without exchanging the material at least in areas with restricted lifetime limits resulting from original design;
- parts with (locally) coating system and/or material based limitations (oxidation/corrosion and/or mechanical/physical properties) cannot be improved without exchanging the material and/or coating system at least at the areas with restricted lifetime limits;
- parts with locally coating system and/or material and/or design based limitations (creep, low cycle fatigue LCF) cannot be improved without exchanging the material and/or coating system and/or by significantly changing the design at least at the areas with restricted lifetime limits.

Without complementing known and established standard refurbishment approaches, customers (a) cannot or (b) cannot reliably or (c) can only by shortening operation intervals and frequently replacing turbine parts, operate their industrial gas turbines (IGTs) within future electric grids ruled by continuously increasing demand for even higher operational flexibility (significantly higher cycling and/or part load operation).

The latter aspect is due to (a) a steadily growing amount of renewable energy sources in electric power grids, (b) changing gas prices and (c) local market energy overcapacities. In the future, gas turbine combined-cycle (GTCC) power plants can only keep or expand its share in power production, if customers will be able to reliably run their plants with favorable cost/KWh as secondary and tertiary response units.

SUMMARY

It is an object of the present invention to provide a gas turbine refurbishing method, which should allow power plant customers (running different gas turbine technology ratings, such as B, E, F, H) to recondition and/or adapt their expensive turbine hardware in order to comply with flexible and frequently changing demands from electric grid(s).

This object is obtained by a method according to the invention for reconditioning a hot gas path part of a gas turbine in order to flexibly adapt an operation regime of said gas turbine for subsequent operation intervals comprises the steps of:

a) providing a hot gas path part to be reconditioned;
b) remove a predetermined area of said hot gas path part, resulting in a cutout at said hot gas path part; c) manufacture a coupon or section for being inserted into said cutout to replace said removed area of said hot gas path part;
d) inserting said coupon or section into said cutout; and
e) joining said hot gas path part with said inserted coupon section;
f) whereby said coupon or section is manufactured by a selective laser melting (SLM) method resulting in a fine grain sized material with significantly improved low cycle fatigue (LCF) lifetime; and
g) whereby said hot gas path part is coated, at least in an area comprising said inserted coupon or section, with a metallic overlay with improved thermo-mechanical fatigue (TMF) and oxidation lifetime.

While the term "coupon" in this context is usually used for a smaller section of a hot gas path part, the term "section" may include bigger section such as a complete airfoil, or the like.

An embodiment of the inventive method is characterized in that said coupon or section is made of a higher oxidation resistant material than said hot gas path part.

Specifically, said coupon or section is made of a highly precipitation strengthened Ni base superalloy.

More specifically, said coupon or section is made of an MM247 alloy.

Preferably, said coupon or section is completely overaluminized by chemical vapor deposition (CVD), physical vapor deposition (PVD) or a slurry process.

According to another embodiment of the invention, in order to introduce a self-healing property, said metallic overlay comprises an additional active phase containing a melting point depressant and/or a substance with a softening point or melting point below an operation temperature or within an operation temperature range of said hot gas path part.

According to a further embodiment of the invention said metallic overlay is applied by a) providing a powder material containing at least a fraction of sub-micron powder particles; and b) applying said powder material to the surface of said hot gas path part by means of a thermal spraying technique to build up a coating layer.

Specifically, said powder material is of the MCrAlY type with M=Fe, Ni, Co, or combinations thereof.

Specifically, said powder material contains powder particles of micron size and/or larger agglomerates, and that the sub-micron particles powder particles are in said coating layer distributed around the surface of said powder particles of micron size and/or said larger agglomerates.

According to another embodiment of the invention at least said area with said metallic overlay is additionally protected by applying a thermal barrier coating (TBC).

According to just another embodiment of the invention said hot gas path part is a front stage vane of a gas turbine, said vane comprising an airfoil with a leading edge and a trailing edge, and that at least part of said trailing edge is replaced by said coupon.

According to a further embodiment of the invention said hot gas path part is a front stage blade of a gas turbine, said blade comprising an airfoil with a leading edge and a trailing edge, and at least a part of said leading edge is replaced by said coupon.

BRIEF DESCRIPTION OF THE DRAWINGS

The present invention is now to be explained more closely by means of different embodiments and with reference to the attached drawings.

DETAILED DESCRIPTION

The new, herewith described method to reconditioning IGT hot gas path parts allows power plant owners to flexibly adapt their operation regime for subsequent operation interval(s), without the need to exchange the expensive turbine hardware by installing new designed spare parts.

Furthermore, parts with already consumed cyclic design lifetime (by previous accomplished operation intervals) can still be reconditioned by locally replacing consumed areas with inserts and/or by application of tailored coating systems, allowing additional subsequent operation (base load and/or cyclic, fuel flexibility) or significant operational changes (to high cyclic load or "peaker" operation).

With the herein described new Reconditioning technology concept (RECONCEPT) parts can be repaired and also significantly changed in their conceptual design intent.

This new approach combines different key technologies:

(a) SLM (selective laser melting) manufactured part sections (also made of difficult to weld materials, such as highly precipitation strengthened Ni base super alloys, using specifically adapted metal powder mixture(s)) to replace local areas;
(b) (optional) locally changed design features/materials; and
(c) the local/overall application of a new metallic and ceramic coating system, specifically tailored for the expected main distress modes (LCF, creep, oxidation, corrosion, erosion).

The new Reconditioning concept (RECONCEPT) is based on four key technology fields:

1) CERCOTEC (advanced ceramic coating technology);
2) AMCOTEC (advanced metallic coating technology); and
3) MODALTEC (Modular/hybrid design concept based on advanced SLM and joining technologies).

With the herein described technology it is also possible to manufacture new IGT parts in a modular design, allowing to always using a determined core element, which can be supplemented with variable inserts. This gives the basis to specifically tailor the final IGT part for a "peaker", cyclic or rather base load operation regime. It is also possible to adapt IGT parts of a gas turbine, in the case that customers need to comply with new market boundary conditions, without having to exchange IGT parts against new parts with different design.

Example 1

Figure 1:
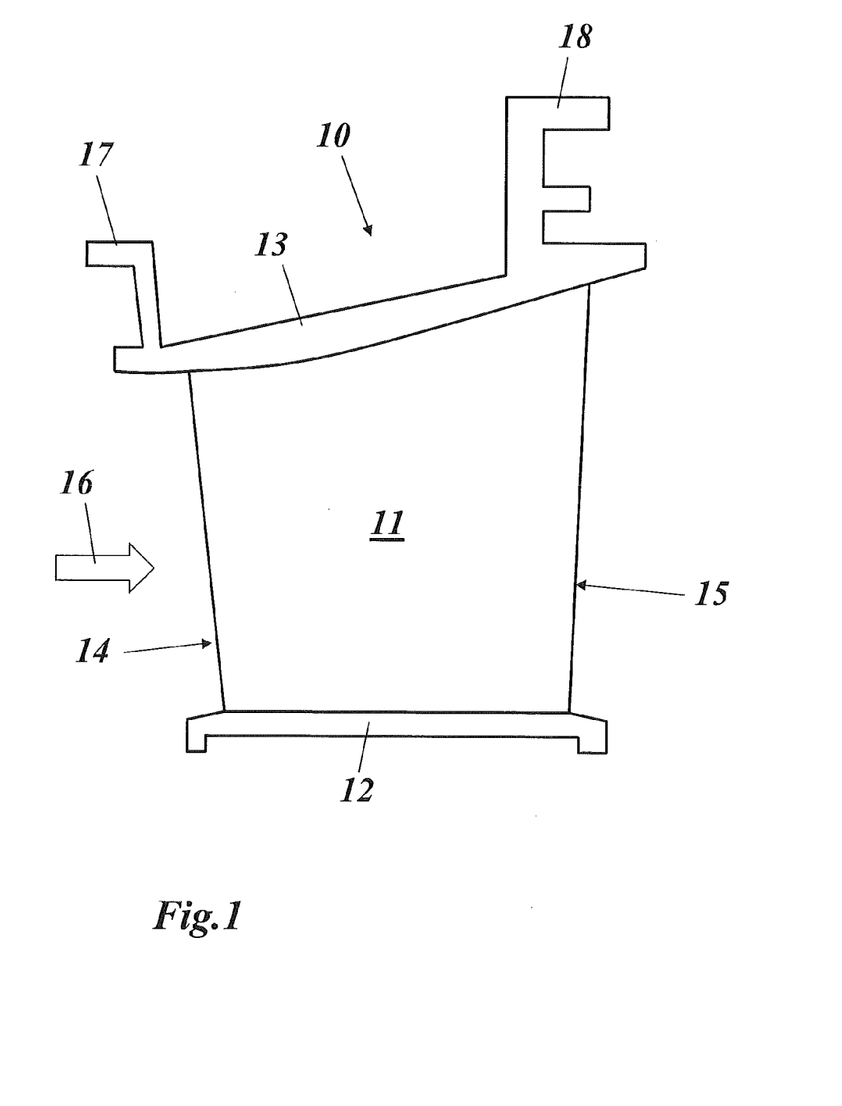
FIG. 1 shows a front stage turbine vane in a side view.

Problem:

Front stage turbine vane with trailing edge (TE) limited in TMF and base material oxidation lifetime. An example of such a vane is shown in FIG. 1 in a side view. The vane 10 of FIG. 1 comprises an airfoil 11 extending between an inner platform 12 and an outer platform 13 with hooks 17 and 18, and having—with respect to the hot gas flow 16 in the hot gas path—a leading edge 14 and a trailing edge 15.

Figure 2A:
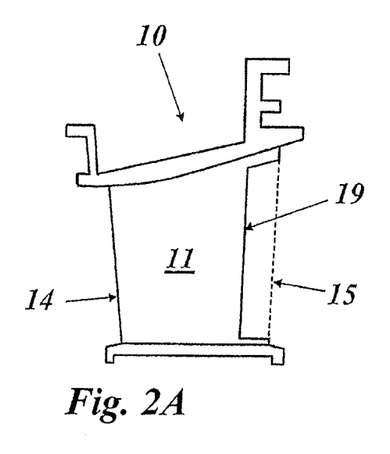
FIG. 2A shows in a first step the vane with removing at least a part of the trailing edge, whereby a cutout remains.
Figure 2B:
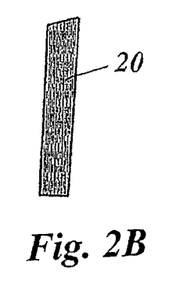
FIG. 2B shows the respective trailing edge coupon manufactured by SLM.
Figure 2C:
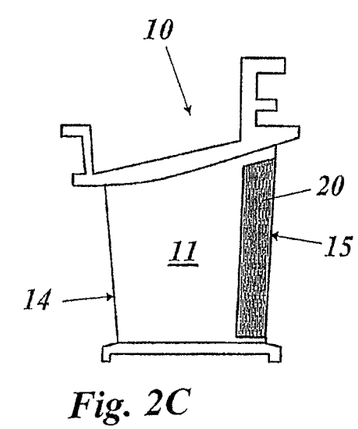
FIG. 2C shows the vane with the coupon inserted into the cutout.

Solution:

Reconditioning of the vane 10 starts with removing at least part of the trailing edge 15 (FIG. 2A), whereby a cutout 19 remains. Then, a respective trailing edge (TE) coupon 20 is manufactured by selective laser melting (SLM) in order to get a fine grain sized material with significantly improved LCF lifetime and (with appropriate heat treatment) local/ overall optimum grain size (FIG. 2B). The coupon 20 is made of higher oxidation resistant material MM247 (instead of IN738) and may be optionally completely over-aluminized by CVD. The coupon 20 is then inserted into the cutout 19 of the vane 10 (FIG. 2C).

Finally, the standard MCrAlY coating is replaced by using a metallic overlay 21 (FIG. 2D) with improved oxidation and TMF lifetime, which may optionally additionally protected by a thermal barrier coating (TBC). These measures will not only give an additional lifetime benefit to the coupon 20 itself, but also to the joint area between vane 10 and coupon 20 with its welding or high temperature brazing in the split line.

For this reconditioning, processes may be used, which are disclosed in document US 2012/0251777 A1.

There, it is described to use at least one base material together with an active phase and optionally with a reservoir phase. The base material is around the active (and the reservoir) phase. The material can be used for a coating, a coupon, a braze joint or part of a vane, blade or liner.

The self healing system comprises an active phase. In particular, this active phase has particles with potentially different shapes and/or fibers, which are optionally woven. The particles or fibers preferably have a core/shell structure. The core and shell can be made of chemical substances like non oxide or oxide ceramics, metals or combinations thereof.

Preferably, the chemical substances of the core have preferably the following characteristics:
a) decrease the melting point of the base material so that softening occurs at operating temperature or have a low (<1000 [deg.] C.) softening or melting temperature;
b) diffuse into the base material and/or optionally into the cracks;
c) do not strongly oxidize when present at the surface in contact with oxygen;
d) are able to chemically dissolve the metal oxides;
e) have a limited reactivity with Cr in order to avoid a decrease of the corrosion resistance; and
f) do not react with the shell substance.

The chemical substances from the core may be solid or liquid at the operating temperature. They may react with the base material, or not.

The chemical substances of the shell, on the other hand, have the following characteristics:
a) diffuse slowly in order to liberate the core substances or break and liberate the core substances;
b) do not react with the core substances; and
c) have a limited reactivity with Cr in order to avoid a decrease of the corrosion resistance.

An additional reservoir phase, which may also have a core/shell structure, might be needed in order to balance the composition and achieve a constant optimal concentration of chemical substances (in particular the concentration of Chromium is important for the corrosion protection).

For the active phase with its core/shell structure, the core substances can be so-called melting point depressants (MDP) like Boron, Carbon, Phosphorous, Silicon, Nickel or a combination thereof. On the other hand, the core may be of a material with a softening or melting temperature below or in the range of the operating temperature according to the invention.

The MDPs preferably react with the base material in order to reduce the melting temperature. Materials with a softening or melting temperature below or in the range of the operating temperature preferably do not react with the base material. The shell substances of the active phase can be Chromium or Nickel or Aluminum or a combination thereof. For the above-mentioned reservoir phase the core substances can be Chromium or Nickel or Aluminum or a combination thereof. The shell substances of the reservoir phase can also be Chromium or Nickel or Aluminum or a combination thereof.

For the processing of the base material with the self healing system, different methods are applicable:

For a coating with a self healing system the active phase and the bond coat particles, for example MCrAlY particles, are dispersed (mixture of both powders or suspension of both powders) and then sprayed with High Velocity Oxy Fuel (HVOF), a standard process to apply a bond coat, or Air Plasma Spray (APS), or Suspension Plasma Spray (SPS), or slurry coating or another process to apply a coating.

For a coupon with a self healing system the active phase and the base material particles, for example superalloy particles, are dispersed (mixture of both powders or suspension of both powders) and processed by means of casting, Selective Laser Melting (SLM) or Selective Laser Sintering (SLS), or any other laser technique, or any additive manufacturing technique.

For a brazed joint with a self healing system a braze sheet or tape or paste with self healing particles or fibers is used.

Figure 2D:
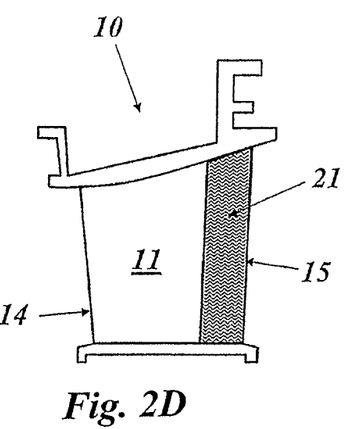
FIG. 2D shows the final reconditioned vane with the metallic overlay as the last step of the method.

A method for applying said metallic overlay 21 may comprise the steps of:
a) providing a metallic powder material containing at least a fraction of sub-micron powder particles; and
b) applying said powder material to the surface to be coated by means of a spraying technique to build up a coating layer.

Said powder material is applied to the surface of the component by means of a thermal spraying technique, especially one of High Velocity Oxygen Fuel Spraying (HVOF), Low Pressure Plasma Spraying (LPPS), Air Plasma Spraying (APS) or Suspension Plasma Spraying (SPS). The powder material has preferably the form of agglomerates or of a suspension.

The powder material preferably contains powder particles of micron size and/or larger agglomerates, and the sub-micron particles powder particles are in said coating layer distributed around the surface of said powder particles of micron size and/or said larger agglomerates. The sub-micron powder particles may be pre-oxidized, especially in-flight during spraying or by an oxidative pre heat treatment of the powder material before being incorporated into said coating layer.

Example 2

Figure 3:
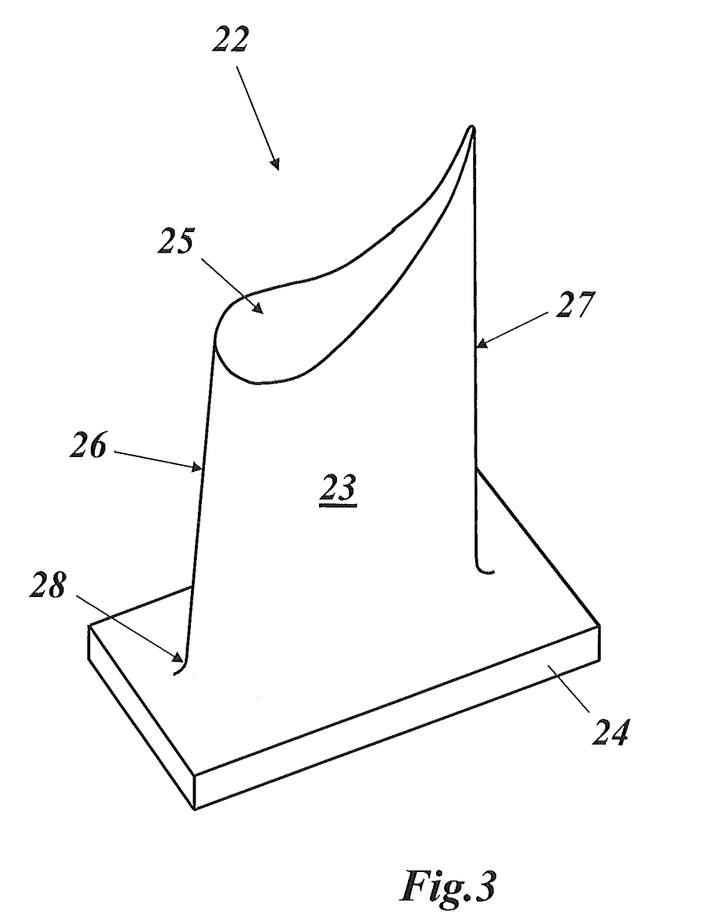
FIG. 3 shows a front stage turbine blade in a perspective side view.

Problem:

Front stage turbine blade with leading edge (LE) incl. transition radius to platform, limited in base material and coating TMF lifetime after reaching the end of the original maximum cyclic lifetime targets. FIG. 3 shows in a perspective side view an example of a turbine blade 22 with an airfoil 23 with leading edge 26 and trailing edge 27, a tip 25 and a platform 24. A transition region 28 between airfoil 23 and platform 24 has a specific transition radius.

Figures 4A, 4B:
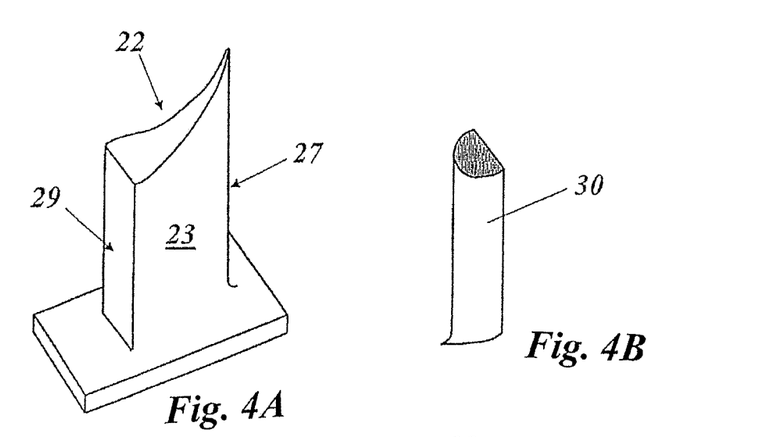
FIG. 4A shows in a first step the blade with removing at least a part of the leading edge, whereby a cutout remains.
FIG. 4B shows the respective leading edge coupon manufactured by SLM.
Figures 4C, 4D:
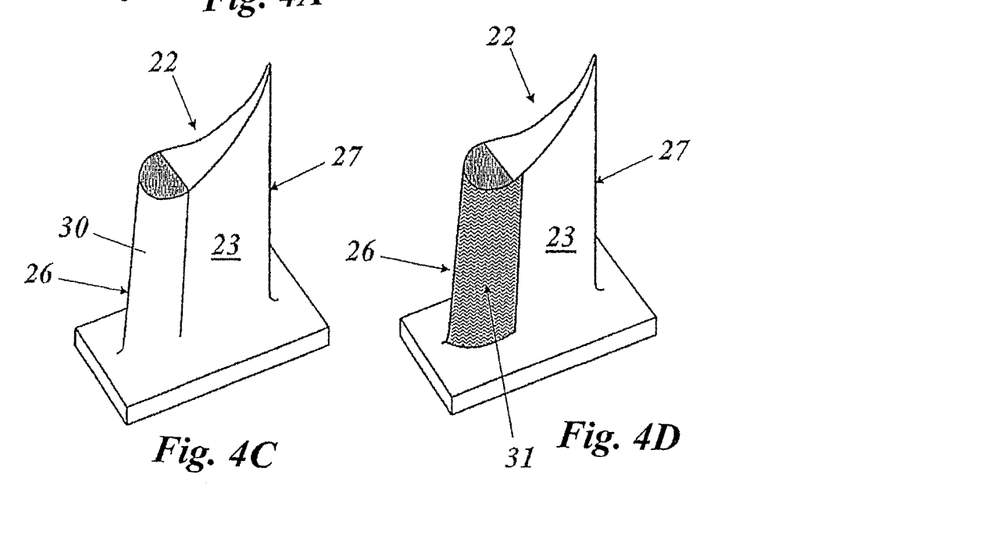
FIG. 4C shows the blade with the coupon inserted into the cutout.
FIG. 4D shows the final reconditioned blade with the metallic overlay as the last step of the method.

Solution:

Reconditioning of the blade 22 starts with removing at least part of the leading edge 26 (FIG. 4A), whereby a cutout 29 remains. Then, a respective leading edge (LE) coupon 30 is manufactured by selective laser melting (SLM) in order to get a fine grain sized material with significantly improved LCF lifetime and (with appropriate heat treatment) local/overall optimum grain size (FIG. 4B). The coupon 30 is made of higher oxidation resistant material MM247 (instead of IN738) and may be optionally completely over-aluminized by CVD. The coupon 30 is then inserted into the cutout 29 of the blade 22 (FIG. 4C). Finally, the standard MCrAlY coating is replaced by using a metallic overlay 31 (FIG. 4D) with improved oxidation and TMF lifetime.

The processes involved may be the same as for example 1.

The invention claimed is:

1. A method for reconditioning a hot gas path part of a gas turbine in order to flexibly adapt an operation regime of said gas turbine for subsequent operation intervals, comprising:
providing a hot gas path part to be reconditioned;
removing a predetermined area of said hot gas path part, resulting in a cutout at said hot gas path part;
manufacturing a coupon or section for being inserted into said cutout to replace said removed area of said hot gas path part;

inserting said coupon or section into said cutout; and
joining said hot gas path part with said inserted coupon or section,
wherein said coupon or section is manufactured by a selective laser melting (SLM) method to obtain a fine grain sized material with improved low cycle fatigue (LCF) lifetime,
wherein said hot gas path part is coated, at least in an area comprising said inserted coupon or section, with a metallic overlay with improved thermo-mechanical fatigue (TMF) and oxidation lifetime,
wherein, in order to introduce a self-healing property, said metallic overlay comprises an additional active phase containing a melting point depressant and/or a substance with a softening point or melting point below an operation temperature or within an operation temperature range of said hot gas path part, and
wherein said coupon or section is completely over-aluminized by chemical vapor deposition (CVD).

2. The method as claimed in claim 1, wherein said coupon or section is made of a higher oxidation resistant material than said hot gas path part.

3. The method as claimed in claim 2, wherein said coupon or section is made of a highly precipitation strengthened Ni base superalloy.

4. The method as claimed in claim 3, wherein said coupon or section is made of an MM247 alloy.

5. The method as claimed in claim 1, wherein said metallic overlay is applied by
a) providing a powder material in which a portion of the powder material is sub-micron powder particles; and
b) applying said powder material to the surface of said hot gas path part by means of a thermal spraying technique to build up a coating layer.

6. The method as claimed in claim 5, wherein said powder material is of the MCrAlY type with M=Fe, Ni, Co, or combinations thereof.

7. The method as claimed in claim 5, wherein said powder material contains powder particles of micron size and/or larger agglomerates, and that the sub-micron powder particles are in said coating layer distributed around the surface of said powder particles of micron size and/or said larger agglomerates.

8. The method as claimed in claim 1, wherein at least said area with said metallic overlay is additionally protected by applying a thermal barrier coating (TBC).

9. The method as claimed in claim 1, wherein said hot gas path part is a front stage vane of a gas turbine, said vane comprising an airfoil with a leading edge and a trailing edge, and that at least part of said trailing edge is replaced by said coupon.

10. The method as claimed in claim 1, wherein said hot gas path part is a front stage blade of a gas turbine, said blade comprising an airfoil with a leading edge and a trailing edge, and that at least part of said leading edge is replaced by said coupon.

11. The method as claimed in claim 1, wherein the softening point or melting point is less than 1000 degrees Celsius.

12. The method as claimed in claim 1, wherein the active phase has particles that are woven.

13. The method as claimed in claim 1, wherein substances of the active phase include Chromium, Nickel, Aluminum, or a combination thereof.

* * * * *